United States Patent
Shui et al.

(10) Patent No.: US 10,956,374 B2
(45) Date of Patent: Mar. 23, 2021

(54) DATA RECOVERY METHOD, APPARATUS, AND SYSTEM

(71) Applicant: Tencent Technology (Shenzhen) Company Limited, Shenzhen (CN)

(72) Inventors: Guolong Shui, Shenzhen (CN); Yunfei Lei, Shenzhen (CN); Jiaxi Li, Shenzhen (CN); Si Chen, Shenzhen (CN); Jinyang Guo, Shenzhen (CN); Ji He, Shenzhen (CN); Lei Su, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 248 days.

(21) Appl. No.: 16/023,969

(22) Filed: Jun. 29, 2018

(65) Prior Publication Data
US 2018/0307569 A1   Oct. 25, 2018

Related U.S. Application Data

(63) Continuation of application No. PCT/CN2017/086117, filed on May 26, 2017.

(30) Foreign Application Priority Data

Jun. 15, 2016 (CN) .......................... 201610427256.X

(51) Int. Cl.
*G06F 16/182* (2019.01)
*G06F 16/174* (2019.01)
*G06F 16/245* (2019.01)

(52) U.S. Cl.
CPC .......... *G06F 16/182* (2019.01); *G06F 16/174* (2019.01); *G06F 16/245* (2019.01)

(58) Field of Classification Search
CPC .... G06F 16/174; G06F 16/182; G06F 16/245; G06F 11/1448; G06F 11/1469
(Continued)

(56) References Cited

U.S. PATENT DOCUMENTS 7,089,009 B1 *  8/2006  Fauconnier ....... H04W 36/0055
                                                   455/445
7,380,140 B1 *  5/2008  Weissman ............ G06F 21/575
                                                   709/213
(Continued)

FOREIGN PATENT DOCUMENTS

CN       104881336 A      9/2015
CN       105373448 A      3/2016
(Continued)

OTHER PUBLICATIONS

International Search Report for PCT/CN2017/086117, dated Aug. 2, 2017. English translation provided. 6p.

*Primary Examiner* — Usmaan Saeed
*Assistant Examiner* — Jessica N Le
(74) *Attorney, Agent, or Firm* — Oblon, McClelland, Maier & Neustadt, L.L.P.

(57) ABSTRACT

This application is related to a data recovery system. The data recovery system includes processing circuitry which receives a restore request. The restore request includes a restore target time. When backup data corresponding to the restore target time is determined to be available, the processing circuitry creates a temporary database service instance and determines information of the temporary database service instance. The processing circuitry further obtains the backup data corresponding to the restore target time and writes the backup data into the temporary database service instance according to the information of the temporary database service instance. The processing circuitry executes a formal restoration operation on the temporary database service instance, in which the backup data is written, according to a received processing request.

14 Claims, 8 Drawing Sheets

(58) Field of Classification Search
USPC .......................................................... 707/645
See application file for complete search history.

(56) References Cited

U.S. PATENT DOCUMENTS

| | | | |
|---|---|---|---|
| 2002/0021665 A1* | 2/2002 | Bhagavath | H04L 43/00 370/229 |
| 2004/0139128 A1* | 7/2004 | Becker | G06F 11/1456 |
| 2005/0216669 A1 | 9/2005 | Zhu et al. | |
| 2008/0183767 A1 | 7/2008 | Zhu et al. | |
| 2010/0257315 A1 | 10/2010 | Zhu et al. | |
| 2011/0019624 A1* | 1/2011 | Lu | H04W 76/22 370/328 |
| 2011/0153567 A1* | 6/2011 | Sawdon | G06F 11/1451 707/645 |
| 2011/0218966 A1* | 9/2011 | Barnes | G06F 11/1451 707/645 |
| 2012/0089572 A1* | 4/2012 | Raichstein | G06F 16/174 707/645 |
| 2012/0179655 A1* | 7/2012 | Beatty | G06F 11/1451 707/646 |
| 2012/0317381 A1 | 12/2012 | Zhu et al. | |
| 2013/0067033 A1* | 3/2013 | Wu | H04L 65/607 709/217 |
| 2014/0129790 A1 | 5/2014 | Zhu et al. | |
| 2015/0254141 A1* | 9/2015 | Wertheimer | G06F 16/22 707/646 |
| 2015/0268876 A1* | 9/2015 | Ahn | G06F 3/0619 711/162 |
| 2015/0293817 A1* | 10/2015 | Subramanian | G06F 16/184 707/645 |
| 2015/0293966 A1* | 10/2015 | Cai | G06F 11/1474 707/648 |
| 2015/0365320 A1* | 12/2015 | Xu | H04L 45/245 370/226 |
| 2016/0034212 A1 | 2/2016 | Zhu et al. | |
| 2016/0306709 A1* | 10/2016 | Shaull | G06F 11/1458 |
| 2020/0014727 A1* | 1/2020 | Barday | H04L 63/102 |

FOREIGN PATENT DOCUMENTS

| | | |
|---|---|---|
| CN | 105446828 A | 3/2016 |
| CN | 106126371 A | 11/2016 |

* cited by examiner

DATA RECOVERY METHOD, APPARATUS, AND SYSTEM

RELATED APPLICATION

This application is a continuation of International Application No. PCT/CN2017/086117, filed on May 26, 2017, which claims priority to Chinese Patent Application No. 201610427256.X, filed with the Chinese Patent Office on Jun. 15, 2016 and entitled "DATA RETRACEMENT METHOD, APPARATUS, AND SYSTEM." The entire disclosures of the prior applications are hereby incorporated by reference in their entirety.

FIELD OF THE TECHNOLOGY

This application relates to a data processing technology.

BACKGROUND OF THE DISCLOSURE

Retracement refers to restoring data in a database to a historical moment, for example, restoring to a moment before a data disorder. When a user of the database needs to perform data retracement for a certain reason (for example, game retracement for replaying a game and a code bug leading to the data disorder), the user initiates a retracement task to restore selected backup data to some data (further called example or instance) of the user based on the backup data generated during a database backup.

SUMMARY

In view of this, there is a need to provide a data recovery method, an apparatus, and a system to resolve a problem that an original data service instance is unable to be read and written in the foregoing recovery process and a problem of data loss caused by an improper backup selection.

In an embodiment of the present application, there is provided a data recovery system.

The data recovery system includes processing circuitry. The processing circuitry receives a restore request. The restore request includes a restore target time. When backup data corresponding to the restore target time is determined to be available, the processing circuitry creates a temporary database service instance and determines information of the temporary database service instance. The processing circuitry further obtains the backup data corresponding to the restore target time and writes the backup data into the temporary database service instance according to the information of the temporary database service instance. The processing circuitry executes a formal restoration operation on the temporary database service instance, in which the backup data is written, according to a received processing request.

In embodiment of the present application, there is provided a data recovery method.

In the data recovery method, a restore request is received. The restore request includes a restore target time. When backup data corresponding to the restore target time is determined to be available, a temporary database service instance is created and information of the temporary database service instance is determined. The backup data corresponding to the restore target time is obtained and the backup data is written into the temporary database service instance according to the information of the temporary database service instance. A formal restoration operation is executed on the temporary database service instance, in which the backup data is written, according to a received processing request.

In an embodiment of the present application, there is provided a data recovery apparatus.

The data recovery apparatus includes a memory and processing circuitry. The processing circuitry receives a restore request. The restore request includes a restore target time. When backup data corresponding to the restore target time is determined to be available, the processing circuitry creates a temporary database service instance and determines information of the temporary database service instance. The processing circuitry further obtains the backup data corresponding to the restore target time and writes the backup data into the temporary database service instance according to the information of the temporary database service instance. The processing circuitry executes a formal restoration operation on the temporary database service instance, in which the backup data is written, according to a received processing request.

In the foregoing data recovery system, method, and apparatus, the temporary data service instance is created to perform retracement/restoration, so that the original data service instance can perform normal reading and writing during retracement/restoration. A user can continue to use a current data service instance during retracement/restoration without being affected by a retracement/restoration operation. At the same time, the temporary data service instance does not directly cover the original data service instance after completing data writing but needs to perform a formal retracement operation according to a user request, so as to avoid the problem of data loss caused by an improper backup data selection.

To make the foregoing and other objectives, features, and advantages of this application more clear and comprehensible, examples are described in detail below with the accompanying drawings.

DESCRIPTION OF EMBODIMENTS

To further explain the technical means adopted in this application for achieving application objectives and effects thereof, specific implementations, structures, features, and effects of this application are explained below in detail with reference to the accompanying drawings and examples.

A data retracement/recovery method, an apparatus, and a system in the embodiment of this application are used to retrace or restore data in a database. A database applicable to the data retracement method, the apparatus, and the system includes, but is not limited to Mongo database (MongoDB), structured query language (SQL) Server, Oracle (ORACLE), my structured query language (MySQL).

A database example (also called a cluster) refers to a single database service instance allocated by an operator to a user. A single user can synchronously have multiple examples. There may be differences of specification and performance in a memory, a magnetic disk, a number of central processing unit (CPU) cores between different examples. Each example has a corresponding network address and a port for the user to connect to and use the database in a cloud server. A formal example refers to a database example (e.g. database service instance) having a complete function. The complete function includes, but is not limited to a manual backup, an automatic backup, network connection providing, data file reading and writing, and the like.

Figure 1:
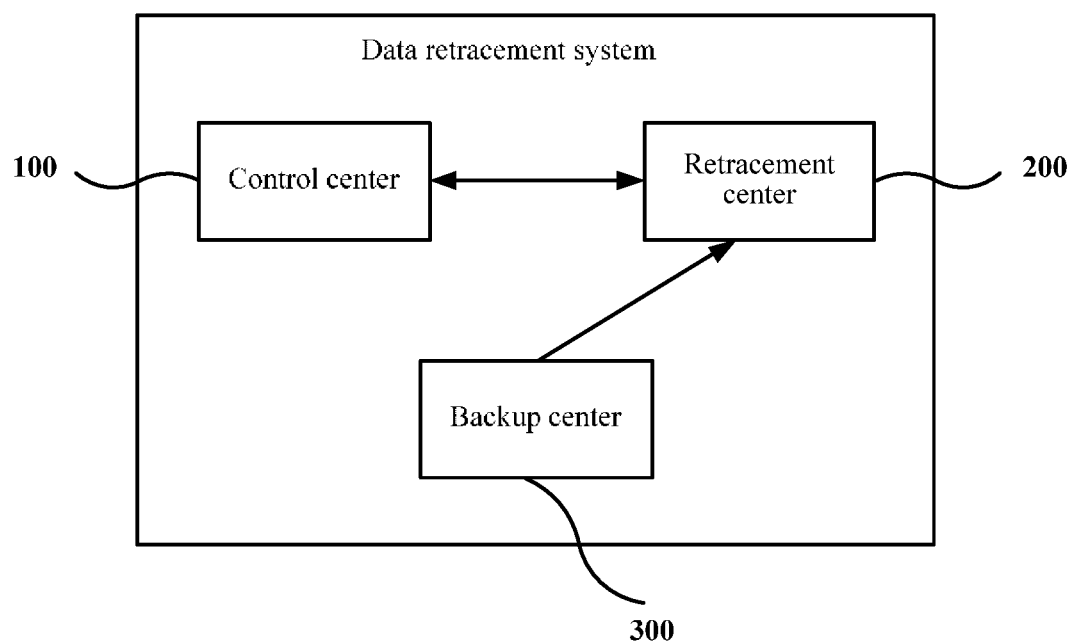
FIG. 1 is a schematic structural diagram of a data retracement system provided according to an embodiment of this application.

FIG. 1 is a schematic structural diagram of a data retracement system provided according to an embodiment of this application. Referring to FIG. 1, the data retracement/recovery system in this embodiment includes a control center 100, a retracement center 200, and a backup center 300.

The backup center 300 is configured to store backup data. In an embodiment of the present application, the backup data includes a full backup and an incremental backup. The full backup refers to data obtained by performing, by the backup center 300, a complete database backup to a database every N days. The incremental backup refers to data obtained by synchronously performing, by the backup center 300, a database oplog (responsible for storing diaries of all database operations and orders) backup. In this case, the backup center 300 keeps data of the full backup and the incremental backup for N+M days, that is, keeps the data of the full backup for N days and keeps the data of the incremental backup for M days. N is an integer larger than 0 and M is an integer larger than or equal to 0. The full backup may be more than one. That, when M is larger than N, a full backup is generated every N days. In this case, a full backup having a generation time more than M days is deleted. For example, if a time that a latest full backup happens is recorded as d, a currently existing full backup may be a full backup generated at a time point d, d−N, d−2*N ... d−k*N, where d1−d+k*N<M and d1 indicates a current time. For example, when more than one full backup is kept, N=5, and M=10, at most two full backups can synchronously exist. When N=5 and M=15, at most three full backups can synchronously exist. When M<N, only one full backup is kept.

In addition, the backup center 300 generates meta-information of the backup data in a backup process. The meta-information of the backup data includes information used to describe the backup data, for example, a start time and an ending time of the backup. It may be understood that a combination of the full backup and the incremental backup is equal to that the backup center 300 automatically perform a data backup every day. A needed target time can be retraced during retracement based on the full backup with reference to the incremental backup.

Based on the foregoing backup function of the backup center 300, an N value and an M value are set to provide a retracement/restore target time segment to a user, so that the user can retrace/restore to any time point in a specified time segment (M days). For example, when N is 5, M is 10, and only one full backup is kept, the user can restore data in the database to any time point in N=5 days before a time of initiating a retracement operation. When N is 5, M is 10, and more than one full backups are kept, the user can restore the data in the database to any time point in M=10 days before the time of initiating the retracement operation. When N is 5 and M is 3, the user can restore the data in the database to any time point in M=3 days before the time of initiating the retracement operation. It is noted that in the foregoing description, 1 day refers to a constant 24 hours instead of 1 natural day, that is, even if the 24 hours include 2 natural days, it cannot be calculated as 2 days.

The control center 100 is configured to: receive a retracement/restore request, the retracement request including a retracement/restore target time; and build or create a temporary example (e.g. temporary data service instance) and send a retracement starting instruction to the retracement center after confirming that the retracement request is executable, the retracement starting instruction including the retracement target time and information of the temporary example.

In an embodiment of the present application, the control center 100 refers to a control center of the database example, configured to manage a state and usage of each duplicate cluster/fragmentation example in the whole example and functions such as moving, upgrade, backup, retracement, monitoring, system deploy, and the like. The temporary example refers to a newly-built example when data retracement is performed on a formal example. The temporary example may be set to be kept for a specified time (for example, 48 hours) and have functional limitations, such as data backup failure (including an automatic backup and a manual backup). In this embodiment, a newly-built temporary example has a same scale and performance with an original example such as an original data service instance (an original formal example). The same scale and performance includes, but is not limited to a memory, a magnetic disk space, and a number of central processing unit (CPU) cores.

The foregoing retracement request is configured to initiate the retracement operation to the control center 100. When the user needs to perform the data retracement for a certain reason, the control center 100 receives the retracement request of the user to start a retracement procedure. Before starting the retracement, the user needs to confirm a specific moment that data is restored to. The specific moment is the retracement target time. In the embodiments of this application, the retracement target time can be any time point in M days before the time of initiating the retracement operation. The retracement target time is an important parameter to obtain the backup data. The retracement request includes the retracement target time, so that the retracement center 200 can obtain specified backup data to perform retracement from the backup center 300.

In an embodiment of the present application, whether the retracement request is executable is confirmed is based on a determining standard. The standard may be, for example, that the retracement target time is in a preset range of the control center 100, or that the backup data corresponding to the retracement target time exists in the backup center 300. In an embodiment of the present application, a process of confirming the retracement request may be: the control center 100 sends a time confirming request to the retracement center 200, the time confirming request including the retracement target time, so that the retracement center 200 queries whether a full backup used for retracement exists in the backup center 300 before the retracement target time and returns a time confirming result according to a query result. The control center confirms that the retracement request is executable if the time confirming result returned by the retracement center is yes. The control center confirms that the retracement request is not executable if the time confirming result is no. In this case, the retracement may be re-initiated by, for example, instructing the user to reselect the retracement target time. The query whether a full backup used for retracement exists in the backup center 300 before the retracement target time may be, determining a time point of a latest full backup after querying the meta-information of the backup data. A full backup corresponding to the time point may be a full backup used for retracement.

The retracement center 200 is configured to: obtain backup data corresponding to the retracement target time from the backup center 300; write the backup data into the temporary example according to the information of the temporary example; and return a writing completion notification to the control center 100.

In an embodiment of the present application, the retracement center 200 starts data writing after receiving the retracement starting instruction. In this case, the retracement center 200 obtains the backup data corresponding to the retracement target time from the backup center 300, decompresses the backup data and writes into the temporary example, and returns the writing completion notification to the control center 100 after completing data writing. The backup data corresponding to the retracement target time may be a full backup corresponding to a time point same with the retracement target time and recorded in the meta-information of the backup data, or may be a combination of a full backup and several incremental backups having a backup time closest to the retracement target time.

According to the retracement method of the embodiments, the original example is not affected during retracement. The example can be read and written, so that the user does not need to use a current example during retracement, thus improving using convenience for the user. In addition, example data obtained during retracement does not directly cover data of the original example, which allows a withdrawing operation, that is, withdrawing to a time before the retracement operation. Even if selected backup data is improper, data obtained after a time selected when performing the retracement operation may not be lost.

In an embodiment of the present application, the control center 100 grants a user permission to access the temporary example after receiving the writing completion notification and prompts the user to perform a data check on the temporary example.

In an embodiment of the present application, to ensure accuracy of data writing during retracement, the user is restrained from accessing the temporary example before data writing is completed. The user can access the temporary example after data writing is completed. In this case, the user can see a temporary example corresponding to a certain formal example in an example list. A manner that allows the user to access the temporary example may be, for example, providing an access address of the temporary example to the user, so that the user can perform the data check by using the access address.

The data check is to check whether retracement data satisfies a user expectation. Because the temporary example is not the formal example and does not directly cover data of the original example after data writing is completed, a formal retracement operation needs to be performed according to a user request. Therefore, data check provides reference to the user to process the temporary example, so as to avoid data loss caused by an improper retracement target time selection.

In an embodiment of the present application, the control center 100 executes a formal retracement/restoration operation on the temporary example, in which data is written, according to a processing request.

In this embodiment, the formal retracement operation includes an operation of formalizing the temporary example as a formal example ("formalization operation" in the following), an operation of replacing an original example with the temporary example ("replacement operation" in the following), or an operation of deleting the temporary example ("deletion operation" in the following). Because the retracement center 200 writes data into a temporary example and the temporary example has functional limitations which may be recycled after being kept for a while. Therefore, after the retracement center 200 completing data writing, the control center 100 may perform the formal retracement operation on the temporary example in which data writing has been completed according to a user request, so as to obtain an example with a complete function.

In an embodiment of the present application, an objective of the formalization operation is to formalize the temporary example in which data writing has been completed as the formal example with a complete function. The formal example does not affect use of the original example, for example, in a manner of existing parallel to the original example. An example obtained by the formalization operation may be used as a data analysis application such as monthly analysis to reduce pressure brought by data analysis to the original example. An objective of the replacement operation is to replace the original example with the temporary example in which data writing has been completed. A finally obtained example may inherit information such as an access address and monitoring data of the original example. However, the retracement target time may be earlier than a time that the database performs a last backup, so the example may not inherit a back tree of the original example. An example obtained by the replacement operation covers the original example. An objective of the deletion operation is to provide a chance to retrace when the user considers that the retracement result does not satisfy the expectation, so that the user can find a proper time point by repeatedly retracing to obtain retracement data that satisfies the expectation. In an embodiment of the present application, a process of the deletion operation may include: the control center 100 deletes the temporary example and releases a resource of the temporary example after receiving a deletion processing request of the user to instruct the user to reperform retracement or end retracement.

In this embodiment, the user may select the formalization operation and the replacement operation when determining that the retracement data satisfies the expectation. The user may select the deletion operation when determining that the retracement data does not satisfy the expectation. It may be understood that the formalization operation, the replacement operation, and the deletion operation may not depend on whether the user expectation is satisfied but depend on actual needs of the user. This application provides three parallel processing operations, so that the user can process the temporary example according to self-requirements to better use the example and the backup data.

Figure 2:
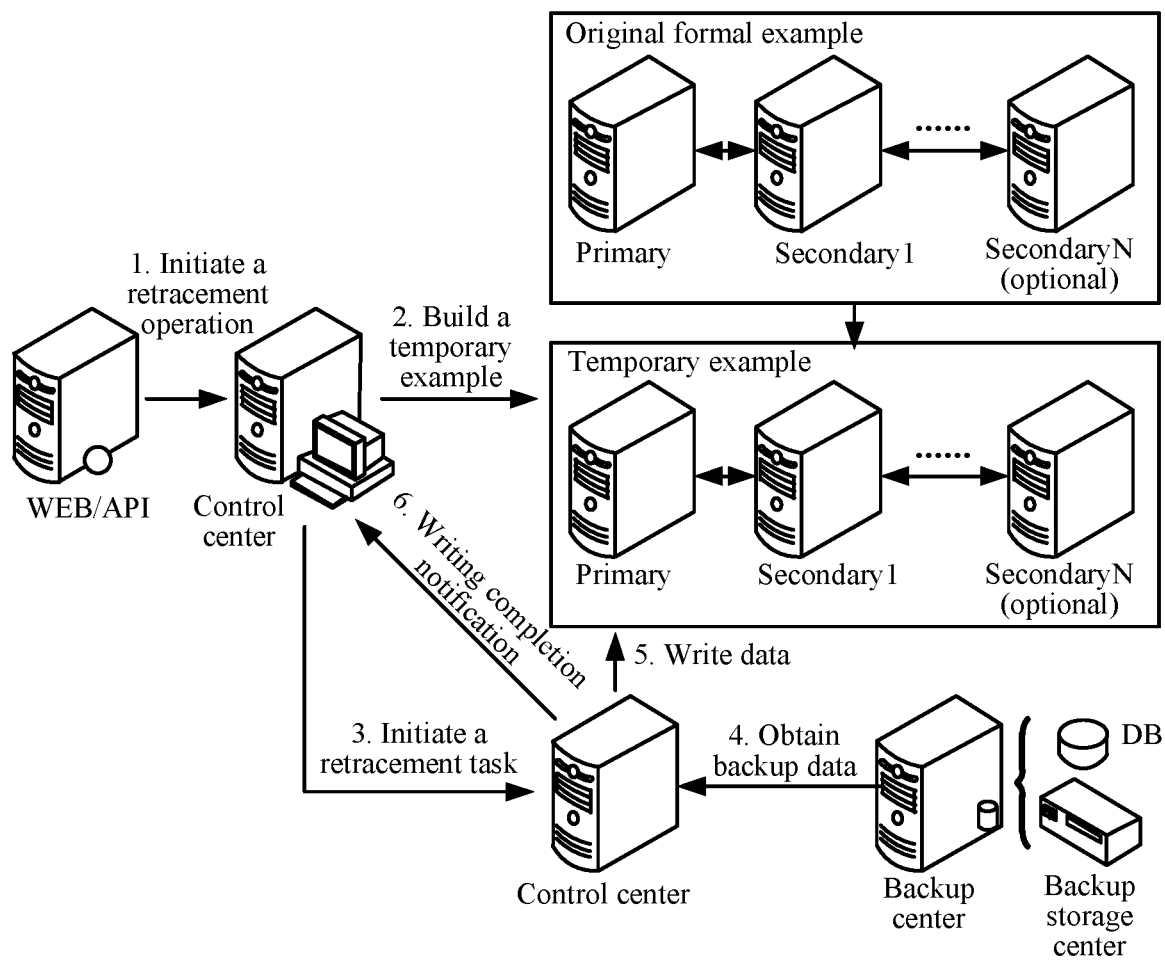
FIG. 2 is a schematic diagram of an application environment of a data retracement system provided according to an embodiment of this application.

The control center 100, the retracement center 200, and the backup center 300 may be respectively implemented by different physical devices, or at least two can be implemented by a same physical device. FIG. 2 is a schematic diagram of an application environment of a data retracement system provided according to an embodiment of this application. In this embodiment, the control center 100, the retracement center 200, and the backup center 300 are respectively an independent server. Data retracement is implemented by an interaction between servers. Referring to FIG. 2, an operating process of the data retracement system in this embodiment may include:

1. A user initiates a retracement operation at a web (WEB) control platform or an application program interface (API).

The user inputs a retracement target time on an application program to initiate the retracement operation. The application program accesses the control center 100 to transfer data by using the API, so that the control center 100 receives a corresponding retracement request. It may be understood that the user may further use the WEB control platform, that is, the data retracement system inputs the retracement target time to initiate the retracement operation based on a user page of the WEB. In an embodiment of the present application, the retracement request includes the retracement target time, so that a retracement center 200 can obtain specified backup data to perform retracement from a backup center 300. In the embodiments of this application, the retracement target time can be any time point in M days before a time of initiating the retracement operation.

2. The control center builds or creates a temporary example after confirming that the retracement request is executable.

Whether the retracement request is executable is confirmed based on a standard. The standard may be, for example, that the retracement target time is in a preset range of the control center 100, or that the backup data corresponding to the retracement target time exists in the backup center 300.

In this application, the temporary example created by the control center 100 refers to a newly-built example when data retracement is performed on a formal example. The temporary example may be set to be kept for a specified time (for example, 48 hours) and have functional limitations, such as data backup failure (including an automatic backup and a manual backup). In this embodiment, a newly-built temporary example has a same scale and performance with an original example (an original formal example). The same scale and performance includes, but is not limited to a memory, a magnetic disk space, and a number of central processing unit (CPU) cores. In this case, the formal example includes a primary node and a plurality of other optional nodes (Secondary1, Secondary2, . . . SecondaryN). Similarly, the temporary example further accordingly includes a primary node and a plurality of other optional nodes (Secondary1, Secondary2, . . . SecondaryN).

3. The control center sends a retracement starting instruction to the retracement center, so that the retracement center starts retracement.

The control center 100 sends the retracement starting instruction to the retracement center 200 after creating the temporary example to initiate a retracement task, the retracement starting instruction including the retracement target time and information of the temporary example, so that the retracement center 200 writes the backup data corresponding to the retracement target time into the temporary example after receiving the retracement starting instruction.

4. The retracement center obtains the backup data from a backup center to decompress.

The retracement center 200 obtains the backup data from the backup center 300 after receiving the retracement starting instruction. In an embodiment of the present application, the backup center 300 includes a meta-information database (DB) and a backup storage center. The DB is used to save meta-information of the backup data and the backup storage center is used to save the backup data. The meta-information of the backup data is information that is generated by the backup center 300 in a backup process and is used to describe the backup data, for example, a start time and an ending time. The retracement center 200 queries a time point DB corresponding to the retracement target time in the DB to find the corresponding backup data, so as to extract the backup data.

5. The retracement center writes the backup data obtained from the backup center into the temporary example.

The retracement center 200 writes the backup data into the temporary example after obtaining and decompressing the backup center.

6. The retracement center returns a writing completion notification to the control center after completing data writing.

The retracement center 200 returns the writing completion notification to the control center 100 after completing data writing, so that the control center 100 performs a formal retracement operation on the temporary example according to a user request. The formal retracement operation includes a formalization operation, a replacement operation, or a deletion operation.

It may be understood that the control center 100, the retracement center 200, and the backup center 300 may be integrated in a server to implement data retracement, which is not limited in FIG. 2.

Figure 3:
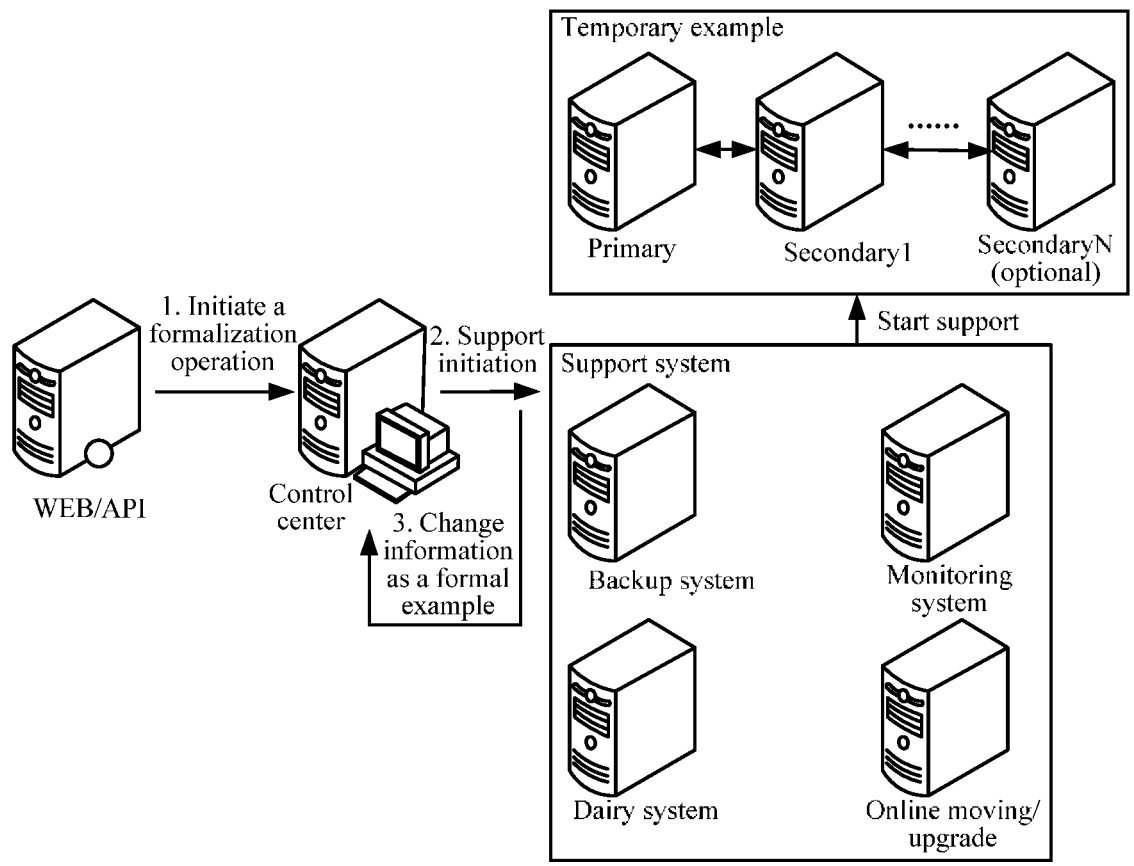
FIG. 3 is an application environment diagram of a formalization operation according to an embodiment of this application.

In an embodiment of the present application, a process of the formalization operation is shown in FIG. 3, including:

1. A user initiates a formalization operation at a web (WEB) control platform or an application program interface (API).

The user initiates the formalization operation at the application program. The application program accesses the control center 100 to transfer data by using the API, so that the control center 100 receives a corresponding retracement request. It may be understood that the user may further use the WEB control platform, that is, the data retracement system initiates the formalization operation based on a user page of the WEB, for example, clicking a specific button, a link, and the like.

2. The control center invokes a support system to start serving the temporary example to complete supporting initiation according to the formalization request.

The support may be a system related to example management and an operation, for example, a backup system, a monitoring system, a dairy center, online moving/upgrade, and the like.

3. The control center modifies information of the temporary example as information of a formal example.

The information of the temporary example is modified as the information of the formal example, that is, granting the temporary example a function that is the same as an original example, so that an example obtained after formalization does not have functional limitations. The temporary example exists parallel to an original formal example after formalization and does not affect use of the original example. An example obtained by the formalization operation may be used as a data analysis application such as monthly analysis to reduce pressure brought by data analysis to the original example.

Figure 4:
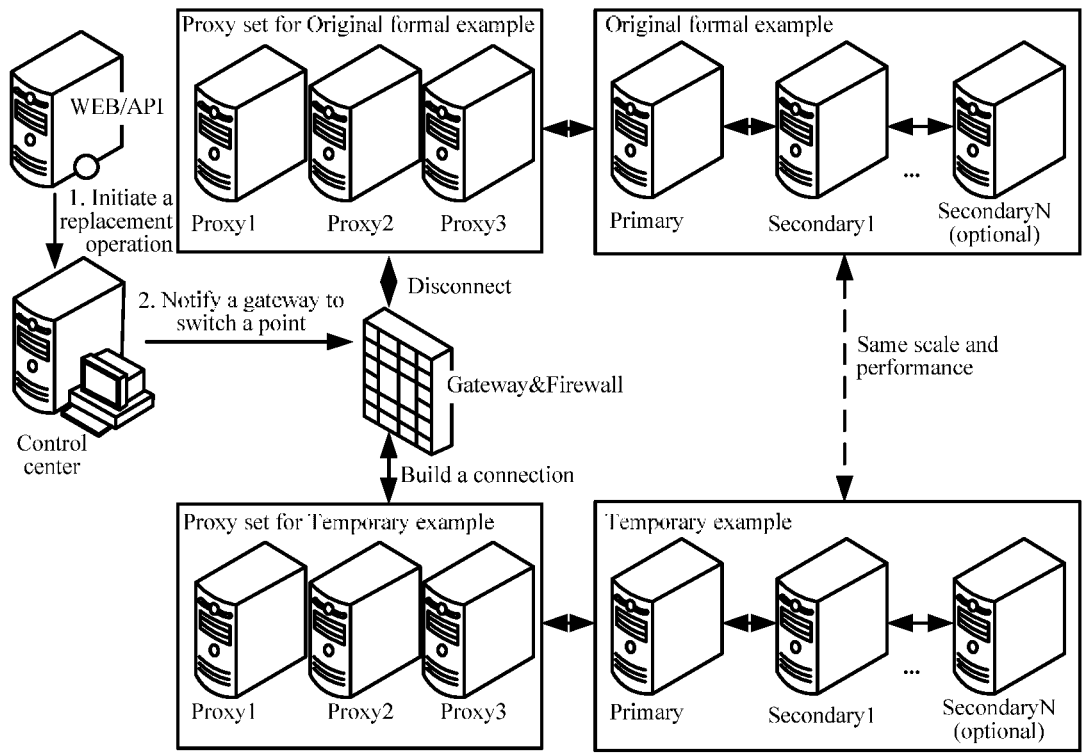
FIG. 4 is an application environment diagram of a replacement operation according to an embodiment of this application.

In an embodiment of the present application, a process of the replacement operation is shown in FIG. 4, including:

1. A user initiates a replacement operation at a web (WEB) control platform or an application program interface (API).

The user initiates the replacement operation at the application program. The application program accesses the control center 100 to transfer data by using the API, so that the control center 100 receives a corresponding replacement request. It may be understood that the user may further use the WEB control platform, that is, the data retracement system initiates the replacement operation based on a user page of the WEB, for example, clicking a specific button, a link, and the like.

2. The control center notifies a gateway to switch from connecting to the original example to connecting to the temporary example according to the replacement request of the user, so that the gateway disconnects a first relationship and a first connection with the original example and builds a second relationship and a second connection with the temporary example.

The gateway disconnects a first relationship and a first connection with the original example and builds a second relationship and a second connection with the temporary example, which refers to that the gateway disconnects a relationship and a connection with a proxy server of the original example and builds a relationship and a connection with a proxy server of the temporary example. The user directly connects to a proxy server corresponding to the example. An example cluster includes a primary node and a plurality of other optional nodes (Secondary1, Secondary2, . . . SecondaryN). Accordingly, the proxy server further includes a proxy set (including Proxy1, Proxy2, Proxy3).

Figure 5:
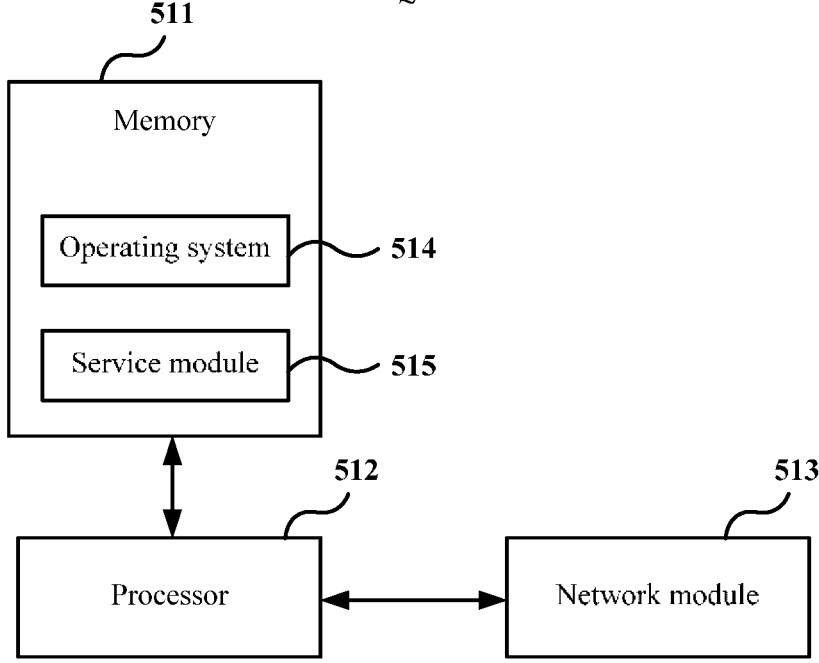
FIG. 5 is a structural block diagram of a control center, a retracement center, or a backup center according to an embodiment of this application.

FIG. 5 is a structural block diagram of a control center, a retracement center, or a backup center according to an embodiment of this application. As shown in FIG. 5, a control center 500, for example, includes a memory 511, a processor 512, and a network module 513.

The memory 511 may be configured to store a software program and a module, for example, a program instruction/module corresponding to a data retracement method, an apparatus, and a system in an embodiment of this application. The processor 512 performs various functional applications and data processing by running the software program and the module stored in the memory 511, that is, implementing the foregoing data retracement method. The memory 511 may include a high-speed random memory, and may also include a nonvolatile memory such as one or more magnetic storage devices, a flash memory, or another nonvolatile solid-state memory. In some embodiments, the memory 511 may further include a memory disposed remote to the processor 512, and the remote memory may be connected to the control center 500 through a network. Instances of the network include, but are not limited to, the Internet, an intranet, a local area network, a mobile communications network, and a combination thereof.

The network module 513 is configured to receive and send a network signal. The network signal may be a wireless signal or a wired signal. In an instance, the foregoing network signal is a wired network signal. At this moment, the network module 513 may include elements such as a processor, a random memory, a converter, and a crystal oscillator.

The foregoing software program and module include: an operating system 514 and a service module 515. The operating system 514 such as LINUX, UNIX, or WINDOWS may include various software components and/or drives configured to manage system tasks (for example, management of memory, control of a storage device, management of a power supply, and the like), and can communicate with various hardware or software components, to provide a running environment to other software components. The service module 515 runs on the operating system 514, and listens to a request from a network by means of network service listening of the operating system 514, completes corresponding data processing according to the request, and returns a processing result to a front page of a system or a client. That is, the service module 515 is configured to provide a network service to the user.

It may be understood that the structure shown in FIG. 5 is only for the purpose of illustration instead of constituting a limitation to the structure of the control center 500. For example, the control center 500 may also include more or fewer components than those shown in FIG. 5, or have a configuration different from that shown in FIG. 5. Each component shown in FIG. 5 may be implemented with hardware, software, or a combination thereof. A structure of the retracement center and the backup center is similar to the control center 500, which is not described herein.

In the data retracement system provided in the embodiments of this application, the temporary example is built to perform retracement, so that the original example can achieve normal reading and writing during retracement. A user can continue to use a current example during retracement without being affected by a retracement operation. At the same time, the temporary example does not directly cover the original example after completing data writing but performs the formal retracement operation according to a user request after the user checks data of the temporary example, so as to avoid the problem of data loss caused by an improper backup data selection. In addition, based on a keeping time of the full backup and the incremental backup of the backup center, the user can retrace to any time point in a specified time segment and provide a deletion selection so that the user can find proper data by repeatedly retracing, thus reducing user loss. In this case, a formal example existing parallel to the original example is obtained by using a formalization operation of this application, so as to effectively reduce pressure of the original example when an item that consumes a large calculation capability such as data analysis needs to be performed.

Figure 6:
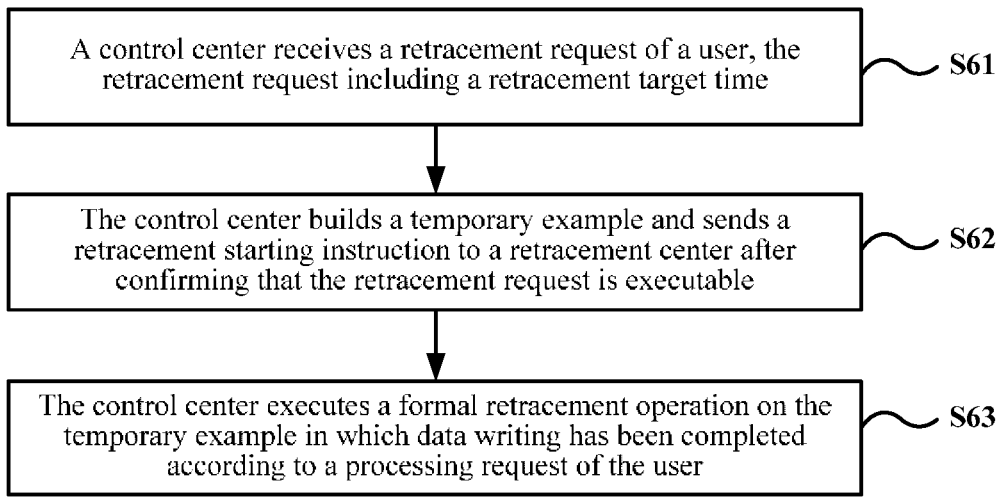
FIG. 6 is a flowchart of a data retracement method according to an embodiment of this application.

FIG. 6 is a flowchart of a data retracement method according to an embodiment of this application. Referring to FIG. 6, the data retracement method in this embodiment may include the following steps:

In step S61, a control center receives a retracement request of a user, the retracement request including a retracement target time.

The control center 100 refers to a control center of the database example, configured to manage a state and usage of each duplicate cluster/fragmentation example in the whole example and functions such as moving, upgrade, backup, retracement, monitoring, system deploy, and the like.

The foregoing retracement request is configured to initiate the retracement operation to the control center 100. When the user needs to perform the data retracement for a certain reason, the control center 100 receives the retracement request of the user to start a retracement procedure. Before starting the retracement, the user needs to confirm a specific moment that data is restored to. The specific moment is the retracement target time. The retracement target time is an important parameter to obtain the backup data. The retracement request includes the retracement target time, so that the retracement center 200 can obtain specified backup data to perform retracement from the backup center 300.

In step S62, the control center builds a temporary example and sends a retracement starting instruction to a retracement center after confirming that the retracement request is executable.

Whether the retracement request is executable is confirmed. A determining standard may be, for example, whether the retracement target time is in a preset range of the control center 100, or whether the backup data corresponding to the retracement target time exists in the backup center 300.

In this application, the temporary example built by the control center 100 refers to a newly-built example when data retracement is performed on a formal example. The temporary example may be set to be kept for a specified time (for example, 48 hours) and have functional limitations, such as data backup failure (including an automatic backup and a manual backup). In this embodiment, a newly-built temporary example has a same scale and performance with an original example (an original formal example). The same scale and performance includes, but is not limited to a memory, a magnetic disk space, and a number of central processing unit (CPU) cores.

The control center 100 sends the retracement starting instruction to the retracement center 200 after building the temporary example, the retracement starting instruction including the retracement target time and information of the temporary example, so that the retracement center 200 writes the backup data corresponding to the retracement target time into the temporary example after receiving the retracement starting instruction.

In step S63, the control center executes a formal retracement operation on the temporary example in which data writing has been completed according to a processing request of the user.

The formal retracement operation includes a formalization operation, a replacement operation, or a deletion operation. An objective of the formalization operation is to formalize the temporary example in which data writing has been completed as the formal example with a complete function. The formal example does not affect use of the original example, for example, in a manner of existing parallel to the original example. An example obtained by the formalization operation may be used to a data analysis application such as monthly analysis to reduce pressure brought by data analysis to the original example. An objective of the replacement operation is to replace the original example with the temporary example in which data writing has been completed. A finally obtained example may inherit information such as an access address and monitoring data of the original example. However, the retracement target time may be earlier than a time that the database performs a last backup, so the example may not inherit a back tree of the original example. An example obtained by the replacement operation covers the original example. An objective of the deletion operation is to provide a chance to retrace when the user considers that the retracement result does not satisfy the expectation, so that the user can find a proper time point by repeatedly retracing to obtain retracement data that satisfies the expectation. In an embodiment of the present application, a process of the deletion operation may include: the control center 100 deletes the temporary example and releases a resource of the temporary example after receiving a deletion processing request of the user to instruct the user to reperform retracement or end retracement.

Details about step S63 may further refer to a specific description about FIG. 3 and FIG. 4, which is not described herein.

In the data retracement method provided in the embodiments of this application, the temporary example is built to perform retracement, so that the original example can achieve normal reading and writing during retracement. A user can continue to use a current example during retracement without being affected by a retracement operation. At the same time, the temporary example does not directly cover the original example after completing data writing but performs the formal retracement operation according to a user request after the user checks data of the temporary example, so as to avoid the problem of data loss caused by an improper backup data selection. In this case, a formal example existing parallel to the original example is obtained by using a formalization operation of this application, so as to effectively reduce pressure of the original example when an item that consumes a large calculation capability such as data analysis needs to be performed.

Figure 7:
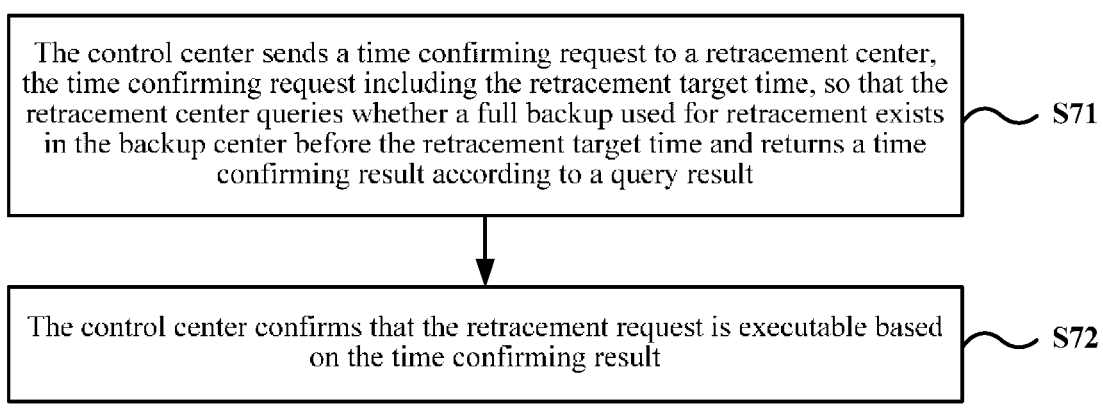
FIG. 7 is a flowchart of a data retracement method according to an embodiment of this application.

FIG. 7 is a flowchart of a data retracement method according to an embodiment of this application. Referring to FIG. 7, the data retracement method provided in this embodiment is similar to the embodiment shown in FIG. 6. A difference is that after step S61, the method further includes Step S71 and Step S72.

In Step S71, the control center sends a time confirming request to a retracement center, the time confirming request including the retracement target time, so that the retracement center queries whether a full backup used for retracement exists in the backup center before the retracement target time and returns a time confirming result according to a query result.

The full backup refers to data obtained by performing, by the backup center 300, a complete database backup to a database every N days. The incremental backup refers to data obtained by synchronously performing, by the backup center 300, a database oplog (responsible for storing diaries of all database operations and orders) backup. In this case, the backup center 300 keeps the data of the full backup for N days and keeps the data of the incremental backup for M days. In addition, the backup center 300 generates meta-information of the backup data in a backup process. The meta-information of the backup data includes information used to describe the backup data, for example, a start time and an ending time of the backup. It may be understood that a combination of the full backup and the incremental backup is equal to that the backup center 300 automatically perform a data backup every day. A needed target time can be retraced during retracement based on the full backup with reference to the incremental backup.

Based on the foregoing backup function of the backup center 300, an N value and an M value are set to provide a specific retracement target time segment to a user, so that the user can retrace to any time point in a specified time segment (M days). For example, when N is 5 and M is 10, the user can restore data in the database to any time point in 5 days before a time of initiating a retracement operation. It is noted that in the foregoing description, 1 day refers to a constant 24 hours instead of 1 natural day, that is, even if the 24 hours include 2 natural days, it cannot be calculated as 2 days.

The query whether a full backup used for retracement exists in the backup center 300 before the retracement target time may be, determining a time point of a latest full backup after querying the meta-information of the backup data. A full backup corresponding to the time point may be a full backup used for retracement.

In step S72, the control center confirms that the retracement request is executable based on the time confirming result.

In the data retracement method provided in the embodiments of this application, the temporary example is built to perform retracement, so that the original example can achieve normal reading and writing during retracement. A user can continue to use a current example during retracement without being affected by a retracement operation. At the same time, the temporary example does not directly cover the original example after completing data writing but performs the formal retracement operation according to a user request after the user checks data of the temporary example, so as to avoid the problem of data loss caused by an improper backup data selection. In addition, based on a keeping time of the full backup and the incremental backup of the backup center, the user can retrace to any time point in a specified time segment and provide a deletion selection so that the user can find proper data by repeatedly retracing, thus reducing user loss. In this case, a formal example existing parallel to the original example is obtained by using a formalization operation of this application, so as to effectively reduce pressure of the original example when an item that consumes a large calculation capability such as data analysis needs to be performed.

Figure 8:
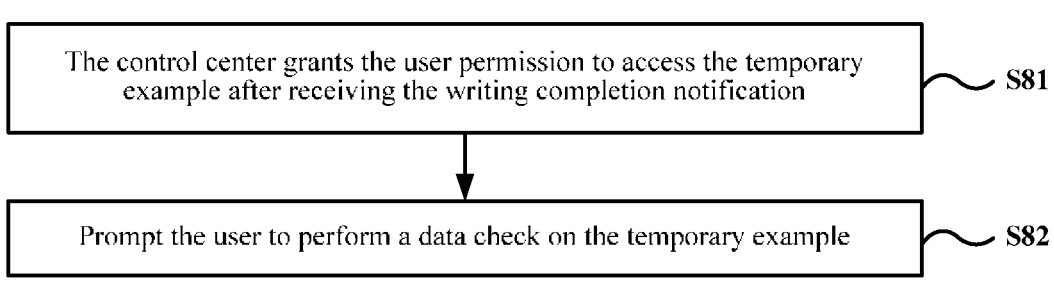
FIG. 8 is a flowchart of a data retracement method according to an embodiment of this application.

FIG. 8 is a flowchart of a data retracement method according to an embodiment of this application. Referring to FIG. 8, the data retracement method provided in this embodiment is similar to the embodiment shown in FIG. 6. A difference is that after step S62, the method further includes:

In step S81, the control center grants the user permission to access the temporary example after receiving the writing completion notification.

To ensure accuracy of data writing during retracement, it is limited that the user accesses the temporary example before completing data writing. The user can access the temporary example after completing data writing. In this case, the user can see a temporary example corresponding to a certain formal example in an example list. A manner that allows the user to access the temporary example may be, for example, providing an access address of the temporary example to the user, so that the user can perform the data check by using the access address.

In step S82, prompt the user to perform a data check on the temporary example.

The data check is to check whether retracement data satisfies a user expectation. Because the temporary example is not the formal example and does not directly cover data of the original example after completing data writing, a formal retracement operation needs to be performed according to a user request. Therefore, data check provides reference to the user to process the temporary example, so as to avoid data loss caused by an improper retracement target time selection.

In the data retracement method provided in the embodiments of this application, the temporary example is built to perform retracement, so that the original example can achieve normal reading and writing during retracement. A user can continue to use a current example during retracement without being affected by a retracement operation. At the same time, the temporary example does not directly cover the original example after completing data writing but performs the formal retracement operation according to a user request after the user checks data of the temporary example, so as to avoid the problem of data loss caused by an improper backup data selection.

Figure 9:
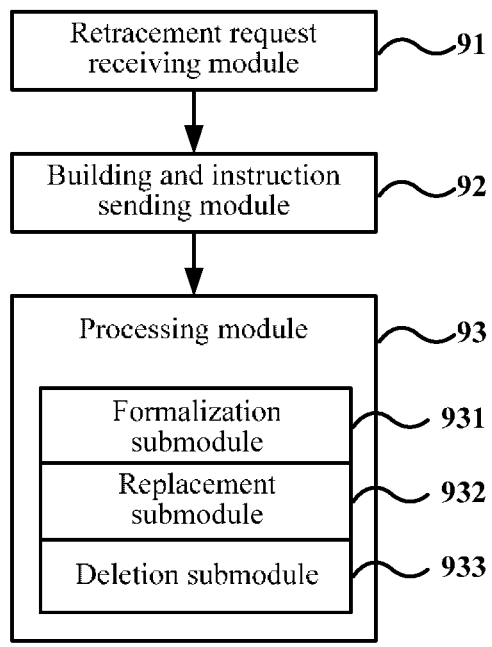
FIG. 9 is a schematic structural diagram of a data retracement apparatus provided according to an embodiment of this application.

FIG. 9 is a schematic structural diagram of a data retracement apparatus provided according to an embodiment of this application. Referring to FIG. 9, the data retracement apparatus provided in this embodiment is executed in a control center 100, including a retracement request receiving module 91, a building and instruction sending module 92, and a processing module 93.

The retracement request receiving module 91 is configured to receive a retracement request of a user, the retracement request including a retracement target time. The building and instruction sending module 92 is configured to build a temporary example and send a retracement starting instruction to a retracement center 200 after confirming that the retracement request is executable, the retracement starting instruction including the retracement target time and information of the temporary example, so that the retracement center 200 obtains backup data corresponding to the retracement target time from a backup center 300; writes the backup data into the temporary example according to the information of the temporary example; and returns a writing completion notification. The processing module 93 is configured to receive the writing completion notification and execute a formal retracement operation on the temporary example in which data writing has been completed according to a processing request of the user. The processing module 93 includes a formalization submodule 931, a replacement submodule 932, and a deletion submodule 933.

Figure 10:
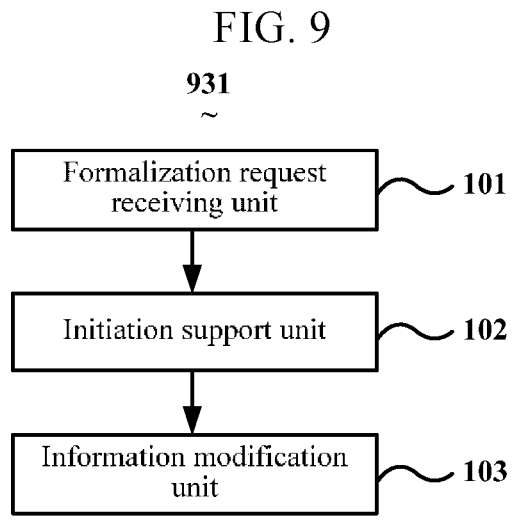
FIG. 10 is a schematic structural diagram of a formalization submodule according to an embodiment of this application.

In an embodiment of the present application, as shown in FIG. 10, the formalization submodule 931 is configured to perform a formalization operation, including a formalization request receiving unit 101, an initiation support unit 102, and an information modification unit 103. The formalization request receiving unit 101 is configured to receive a formalization processing request of the user. The initiation support unit 102 is configured to invoke a support system to start serving the temporary example to support initiation according to the formalization request. The information modification unit 103 is configured to modify the information of the temporary example as information of the formal example after the support system completes supporting initiation.

Figure 11:
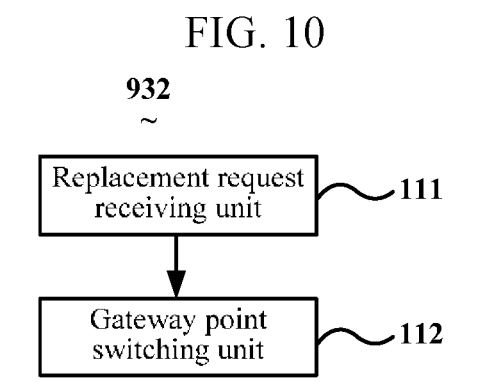
FIG. 11 is a schematic structural diagram of a replacement submodule according to an embodiment of this application.

In an embodiment of the present application, as shown in FIG. 11, the replacement submodule 932 is configured to perform a replacement operation, including a replacement request receiving unit 111 and a gateway point switching unit 112. The replacement request receiving unit 111 is configured to receive a replacement processing request of the user. The gateway point switching unit 112 is configured to notify a gateway to switch to point the temporary example according to the replacement request, so that the gateway disconnects a relationship and a connection with the original example and builds a relationship and a connection with the temporary example.

Figure 12:
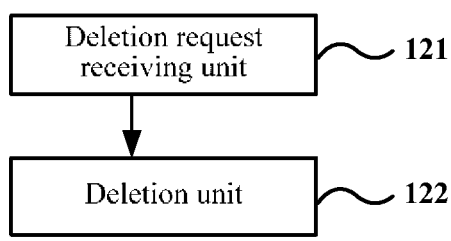
FIG. 12 is a schematic structural diagram of a deletion submodule according to an embodiment of this application.

In an embodiment of the present application, as shown in FIG. 12, the deletion submodule 933 is configured to perform a deletion operation, including a deletion request receiving unit 121 and a deletion unit 122. The deletion request receiving unit 121 is configured to receive a deletion processing request of the user. The deletion unit 122 is configured to delete the temporary example and release a resource of the temporary example. The deletion submodule 933 may further include an instruction unit configured to instruct the user to reperform retracement or end retracement.

A specific process that each functional module of the data retracement apparatus provided in this embodiment implements functions may refer to a specific description in FIG. 6, which is not described herein.

In the data retracement apparatus provided in the embodiments of this application, the temporary example is built to perform retracement, so that the original example can achieve normal reading and writing during retracement. A user can continue to use a current example during retracement without being affected by a retracement operation. At the same time, the temporary example does not directly cover the original example after completing data writing but performs the formal retracement operation according to a user request after the user checks data of the temporary example, so as to avoid the problem of data loss caused by an improper backup data selection. In this case, a formal example existing parallel to the original example is obtained by using a formalization operation of this application, so as to effectively reduce pressure of the original example when an item that consumes a large calculation capability such as data analysis needs to be performed.

Figure 13:
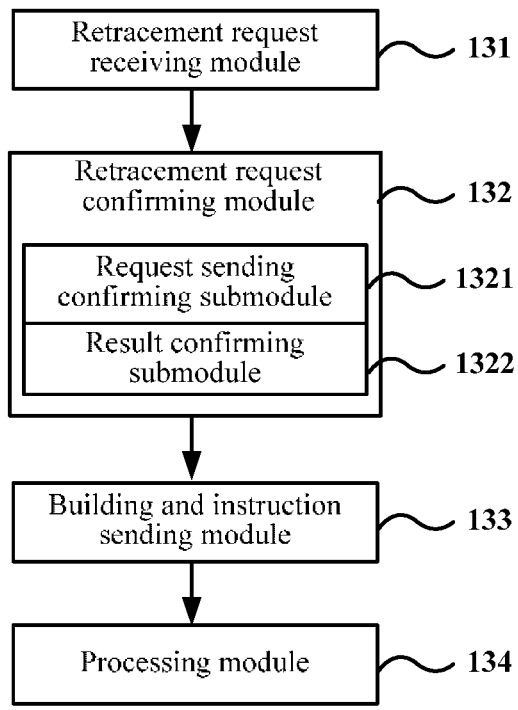
FIG. 13 is a schematic structural diagram of a data retracement apparatus provided according to an embodiment of this application.

FIG. 13 is a schematic structural diagram of a data retracement apparatus provided according to an embodiment of this application. Referring to FIG. 13, the data retracement apparatus in this embodiment includes a retracement request receiving module 131, a retracement request confirming module 132, a building and instruction sending module 133, and a processing module 134.

The retracement request receiving module 131 is configured to receive a retracement request of a user, the retracement request including a retracement target time.

The retracement request confirming module 132 includes a request sending confirming submodule 1321 and a result confirming submodule 1322. The request sending confirming submodule 1321 is configured to send a time confirming request to a retracement center 200 after receiving the retracement request, the time confirming request including the retracement target time, so that the retracement center 200 queries whether a full backup used for retracement exists in the backup center 300 before the retracement target time and returns a time confirming result according to a query result. The result confirming submodule 1322 is configured to confirm that the retracement request is executable based on the time confirming result.

The building and instruction sending module 133 is configured to build a temporary example and send a retracement starting instruction to a retracement center 200 after confirming that the retracement request is executable, the retracement starting instruction including the retracement target time and information of the temporary example, so that the retracement center 200 obtains backup data corresponding to the retracement target time from a backup center 300; writes the backup data into the temporary example according to the information of the temporary example; and returns a writing completion notification.

The processing module 134 is configured to receive the writing completion notification and execute a formal retracement operation on the temporary example in which data writing has been completed according to a processing request of the user.

A specific process that each functional module of the data retracement apparatus provided in this embodiment implements functions may refer to a specific description in FIG. 7, which is not described herein.

In the data retracement apparatus provided in the embodiments of this application, the temporary example is built to perform retracement, so that the original example can achieve normal reading and writing during retracement. A user can continue to use a current example during retracement without being affected by a retracement operation. At the same time, the temporary example does not directly cover the original example after completing data writing but performs the formal retracement operation according to a user request after the user checks data of the temporary example, so as to avoid the problem of data loss caused by an improper backup data selection. In addition, based on a keeping time of the full backup and the incremental backup of the backup center, the user can retrace to any time point in a specified time segment and provide a deletion selection so that the user can find proper data by repeatedly retracing, thus reducing user loss. In this case, a formal example existing parallel to the original example is obtained by using a formalization operation of this application, so as to effectively reduce pressure of the original example when an item that consumes a large calculation capability such as data analysis needs to be performed.

Figure 14:
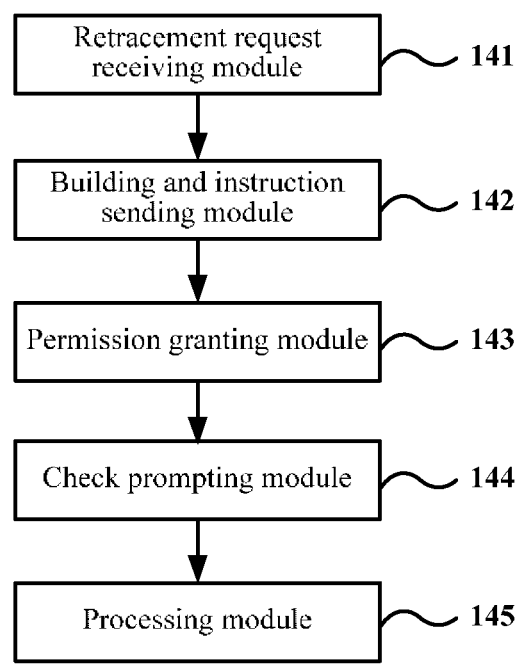
FIG. 14 is a schematic structural diagram of a data retracement apparatus provided according to an embodiment of this application.

FIG. 14 is a schematic structural diagram of a data retracement apparatus provided according to an embodiment of this application. Referring to FIG. 14, the data retracement apparatus in this embodiment includes a retracement request receiving module 141, a building and instruction sending module 142, a permission granting module 143, a check prompting module 144, and a processing module 145.

The retracement request receiving module 141 is configured to receive a retracement request of a user, the retracement request including a retracement target time.

The building and instruction sending module 142 is configured to build a temporary example and send a retracement starting instruction to a retracement center 200 after confirming that the retracement request is executable, the retracement starting instruction including the retracement target time and information of the temporary example, so that the retracement center 200 obtains backup data corresponding to the retracement target time from a backup center 300; writes the backup data into the temporary example according to the information of the temporary example; and returns a writing completion notification.

The permission granting module 143 is configured to grant the user a permission of accessing the temporary example after receiving the writing completion notification.

The check prompting module 144 is configured to prompt the user to perform a data check to the temporary example.

The processing module 145 is configured to receive the writing completion notification and execute a formal retracement operation on the temporary example in which data writing has been completed according to a processing request of the user.

A specific process that each functional module of the data retracement apparatus provided in this embodiment implements functions may refer to a specific description in FIG. 8, which is not described herein.

In the data retracement apparatus provided in the embodiments of this application, the temporary example is built to perform retracement, so that the original example can perform normal reading and writing during retracement. A user can continue to use a current example during retracement without being affected by a retracement operation. At the same time, the temporary example does not directly cover the original example after completing data writing but performs the formal retracement operation according to a user request after the user checks data of the temporary example, so as to avoid the problem of data loss caused by an improper backup data selection. In this case, a formal example existing parallel to the original example is obtained by using a formalization operation of this application, so as to effectively reduce pressure of the original example when an item that consumes a large calculation capability such as data analysis needs to be performed.

It may be noted that the embodiments in this specification are all described in a progressive manner. Description of each of the embodiments focuses on differences from other embodiments, and reference may be made to each other for the same or similar parts among respective embodiments. The apparatus embodiments are substantially similar to the method embodiments and therefore are only briefly described, and reference may be made to the method embodiments for the associated part.

Descriptions above are merely examples of this application, and are not intended to limit this application. Although this application has been disclosed above in forms of certain embodiments, the embodiments are not intended to limit this application. A person skilled in the art can make some equivalent variations, alterations or modifications to the above disclosed technical content without departing from the scope of the technical solutions of the above disclosed technical content to obtain equivalent embodiments. Any simple alteration, equivalent change or modification made to the foregoing embodiments according to the technical essence of this application without departing from the content of the technical solutions of this application shall fall within the scope of the technical solutions of this application.

What is claimed is:

1. A data recovery system, comprising:
   at least one memory; and
   at least one processor, that when executing instructions stored in the at least one memory, is configured to
   receive a restore request from a user that has access to an original database service, the restore request including a restore target time for restoring a previous state of the original database service;
   when backup data corresponding to the restore target time is determined to be available, create a temporary database service and determine information of the temporary database service, wherein the temporary database service includes a same amount of memory, a same magnetic disk space, and a same number of central processing unit (CPU) cores as the original database service;
   obtain the backup data corresponding to the restore target time and write the backup data into the temporary database service according to the information of the temporary database service; and
   execute a formal restoration operation on the temporary database service, in which the backup data is written, according to a received processing request, wherein
   the formal restoration operation on the temporary database service includes formalizing the temporary database service as a formal database service by invoking a support system to serve the temporary database service to support initiation of the temporary database service, and modifying the information of the temporary database service as information of the formal database service when the support system completes supporting the initiation, and
   wherein the formal restoration operation on the temporary database service further includes replacing an original database service with the temporary database service, which includes switching a gateway from connecting to the original database service to connecting to the temporary database service, the gateway disconnecting a first relationship and a first connection with the original database service and building a second relationship and a second connection with the temporary database service.

2. The data recovery system according to claim 1, wherein the at least one processor is further configured to
   perform an incremental backup of data and store the data of the incremental backup in a database for M (M is an integer of 0 or more) days; and
   synchronously perform a full backup of the data every N (N is an integer of 1 or more) days and store the data of the full backup in the database for N days.

3. The data recovery system according to claim 2, wherein the at least one processor is further configured to
   query whether the full backup of the data corresponding to the restore target time exists before the restore target time according to a time confirming request; and
   determine that the restore request is executable based on a query result.

4. The data recovery system according to claim 1, wherein the at least one processor is further configured to
   grant a user permission to access the temporary database service and prompt the user to perform a data check on the temporary database service.

5. The data recovery system according to claim 1, wherein the formal restoration operation on the temporary database service further includes deleting the temporary database service.

6. The data recovery system according to claim 5, wherein the deleting the temporary database service includes
   deleting the temporary database service and releasing a resource of the temporary database service.

7. A data recovery method, comprising:
   receiving from a user that has access to an original database service, the restore request including a restore target time for restoring a previous state of the original database service;
   when backup data corresponding to the restore target time is determined to be available, creating a temporary database service and determining information of the temporary database service, wherein the temporary database service includes a same amount of memory, a same magnetic disk space, and a same number of central processing unit (CPU) cores as the original database service;
   obtaining, by processing circuitry of a data recovery system, the backup data corresponding to the restore target time and writing the backup data into the temporary database service according to the information of the temporary database service; and executing a formal restoration operation on the temporary database service, in which the backup data is written, according to a received processing request,
wherein
the formal restoration operation on the temporary database service includes formalizing the temporary database service as a formal database service by invoking a support system to serve the temporary database service to support initiation of the temporary database service, and modifying the information of the temporary database service as information of the formal database service when the support system completes supporting the initiation, and
wherein the formal restoration operation on the temporary database service further includes replacing an original database service with the temporary database service, which includes switching a gateway from connecting to the original database service to connecting to the temporary database service, the gateway disconnecting a first relationship and a first connection with the original database service and building a second relationship and a second connection with the temporary database service.

8. The data recovery method according to claim 7, further comprising:
performing an incremental backup of data and storing the data of the incremental backup in a database for M (M is an integer of 0 or more) days; and
synchronously performing a full backup of the data every N (N is an integer of 1 or more) days and storing the data of the full backup in the database for N days.

9. The data recovery method according to claim 8, further comprising:
querying whether the full backup of the data corresponding to the restore target time exists before the restore target time according to a time confirming request; and
determining that the restore request is executable based on a query result.

10. The data recovery method according to claim 7, further comprising:
granting a user permission to access the temporary database service and prompting the user to perform a data check on the temporary database service.

11. The data recovery method according to claim 7, wherein the formal restoration operation on the temporary database service further includes deleting the temporary database service instance.

12. The data recovery method according to claim 11, wherein the deleting the temporary database service includes
deleting the temporary database service and releasing a resource of the temporary database service.

13. A data recovery apparatus, comprising:
a memory; and
at least one processor configured to
receive a restore request from a user that has access to an original database service, the restore request including a restore target time for restoring a previous state of the original database service;
when backup data corresponding to the restore target time is determined to be available, create a temporary database service and determine information of the temporary database service, wherein the temporary database service includes a same amount of memory, a same magnetic disk space, and a same number of central processing unit (CPU) cores as the original database service;
obtain the backup data corresponding to the restore target time and write the backup data into the temporary database service according to the information of the temporary database service; and
execute a formal restoration operation on the temporary database service, in which the backup data is written, according to a received processing request,
wherein
the formal restoration operation on the temporary database service includes formalizing the temporary database service as a formal database service by invoking a support system to serve the temporary database service to support initiation of the temporary database service, and modifying the information of the temporary database service as information of the formal database service when the support system completes supporting the initiation, and
wherein the formal restoration operation on the temporary database service further includes replacing an original database service instance with the temporary database service, which includes switching a gateway from connecting to the original database service to connecting to the temporary database service, the gateway disconnecting a first relationship and a first connection with the original database service and building a second relationship and a second connection with the temporary database service.

14. The data recovery apparatus according to claim 13, wherein
the formal restoration operation on the temporary database service further includes deleting the temporary database service; and
the at least one processor is further configured to
when the formal restoration operation on the temporary database service is the deleting the temporary database service,
delete the temporary database service and release a resource of the temporary database service.

* * * * *